United States Patent [19]

Antonini et al.

[11] Patent Number: 5,340,126
[45] Date of Patent: Aug. 23, 1994

[54] FLANGELESS FIRE RING HOLDER

[75] Inventors: Joseph Antonini, Chicago; Ronald T. Budovec, Oakbrook, both of Ill.

[73] Assignee: Dana Corporation, Toledo, Ohio

[21] Appl. No.: 994,394

[22] Filed: Dec. 21, 1992

[51] Int. Cl.$^5$ .............................................. F16J 15/12
[52] U.S. Cl. .................... 277/181; 277/189; 277/235 B
[58] Field of Search .............. 277/180, 182, 184, 189, 277/235 B, 9

[56] References Cited

U.S. PATENT DOCUMENTS

| | | |
|---|---|---|
| 2,851,317 | 9/1958 | Greifenstein . |
| 3,108,818 | 10/1963 | Furstenburg . |
| 3,519,278 | 7/1967 | Fuhrmann et al. . |
| 3,565,449 | 2/1971 | Ascencio . |
| 4,026,565 | 5/1977 | Jelinek ................ 277/235 B X |
| 4,480,844 | 11/1984 | Kozerski . |
| 4,605,236 | 8/1986 | Tsuchihashi et al. . |
| 5,039,117 | 8/1991 | Gohrlich et al. . |

FOREIGN PATENT DOCUMENTS

| | | |
|---|---|---|
| 3903918 | 8/1990 | Fed. Rep. of Germany ... 277/235 B |
| 3939572 | 6/1991 | Fed. Rep. of Germany ... 277/235 B |
| 50257 | 3/1985 | Japan ................. 277/235 B |
| 227853 | 9/1989 | Japan ................. 277/235 B |
| 2286859 | 11/1990 | Japan . |
| 752083 | 7/1980 | U.S.S.R. . |
| 623835 | 5/1949 | United Kingdom . |
| 2092244 | 8/1982 | United Kingdom . |

*Primary Examiner*—William A. Cuchlinski, Jr.
*Assistant Examiner*—Scott W. Cummings
*Attorney, Agent, or Firm*—Dykema Gossett

[57] ABSTRACT

A fire ring holder is disposed around the boundary of a cylinder bore opening of a gasket to retain a fire ring. The fire ring holder includes a plurality of radially extending spaced tabs which mechanically engage either the upper or lower surface of the gasket body. The ring can be retained using the body of the holder, whose curvature from an upper edge to a lower edge conforms to that of the fire ring. Alternatively, a number of spaced tabs extend radially inwardly to engage the fire ring.

11 Claims, 3 Drawing Sheets

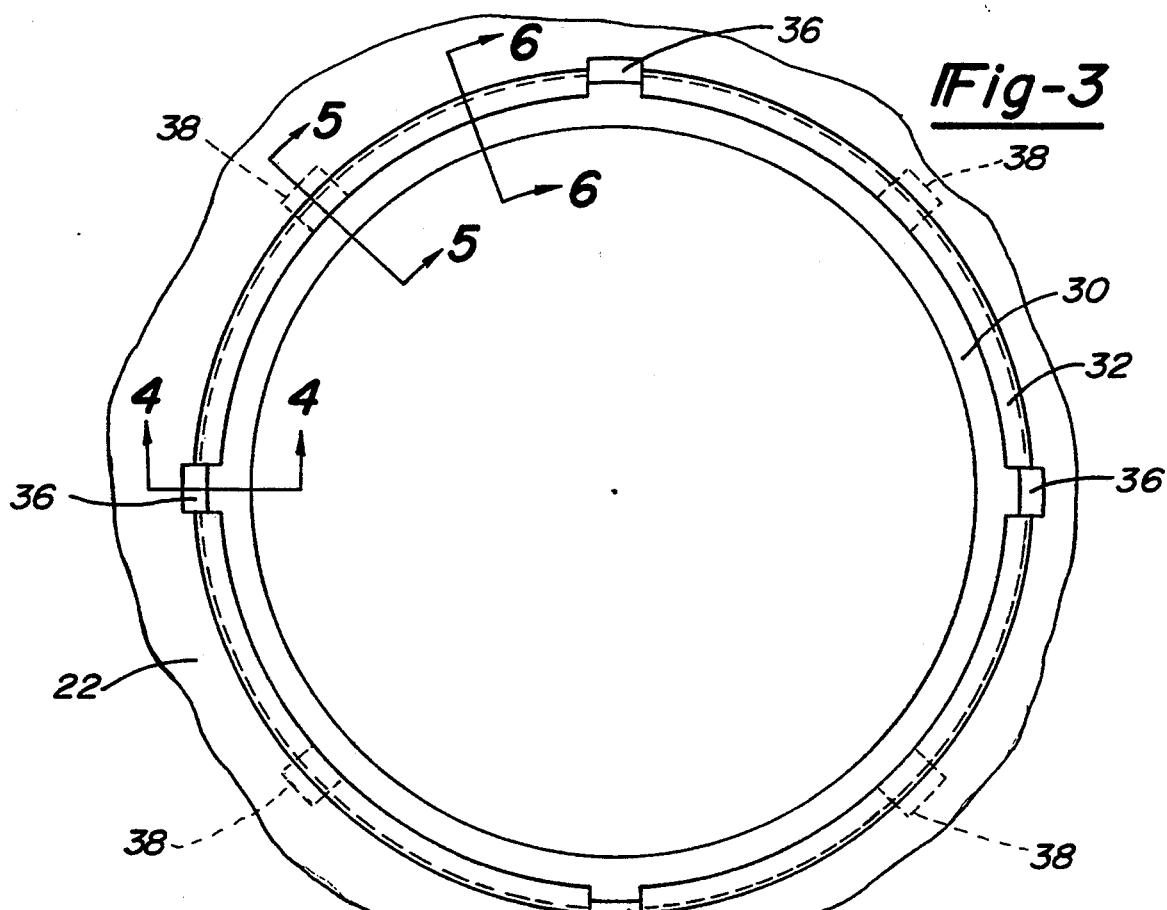
*Fig-3*
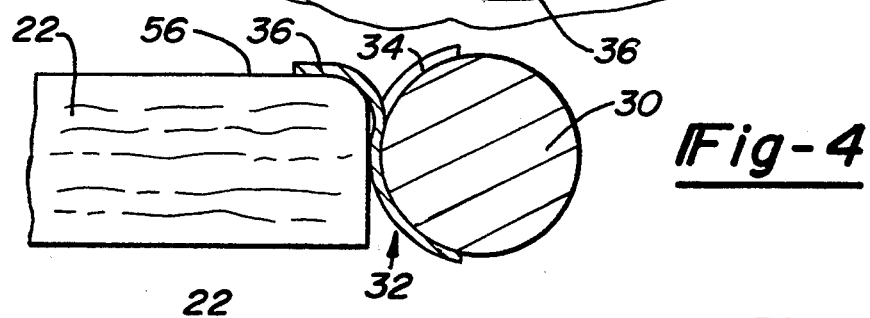
*Fig-4*
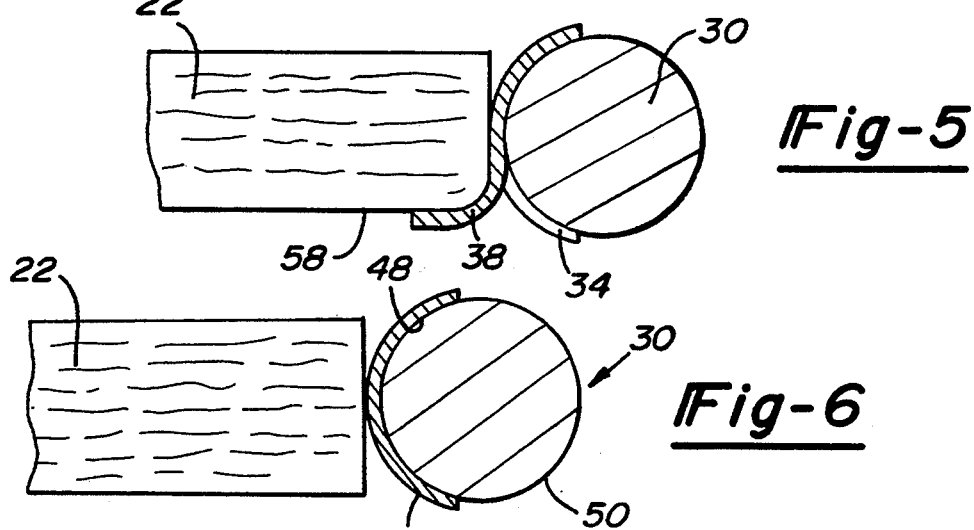
*Fig-5*
*Fig-6*

FLANGELESS FIRE RING HOLDER

BACKGROUND OF THE INVENTION

The present invention relates to an improved fire ring holder to hold a fire ring in a cylinder opening of a gasket.

Gaskets are used as a seal between the engine block and cylinder head of an internal combustion engine. Cylinder head gaskets typically extend around the cylinder bores to provide a combustion seal, maintaining the high temperature gases of combustion within a cylinder bore. The gasket bears the load from a bolted connection of the engine block and cylinder head components and relies upon that load to provide a seal.

It is known to provide cylinder head gaskets with a fire ring adjacent the cylinder bores to protect the actual gasket body from the deleterious effects of the combustion environment. Typically, an annular metallic flange has been provided for retaining the fire ring to the gasket body. This flange is generally U-shaped in cross-section, having upper and lower legs which extend continuously around a cylinder bore and engage upper and lower surfaces of the gasket. The fire ring is enclosed within a trough of the holder defined by the U-shaped cross-section.

Up to 30% of the clamping force from the bolted connection of the mechanical components is used to secure such flanges to the gasket. Thus, this portion of the force is not available to prevent leakage from the various seals. A high force is necessary due to the relatively large contact area between the mechanical components and the flange legs.

Moreover, such flanges require a large amount of material and are associated with high tooling and manufacturing costs. The fire ring must be manually loaded into the U-shaped trough. Then a closing die must be used which forms and presses the flange legs over the ring and the gasket body. A flattening operation is then required which must be inspected to confirm that the flange is at a pre-established height.

Further, by enclosing the fire ring within a flange, the possible cross-sectional diameter of the ring is limited by the thickness of the gasket minus the thickness of each of the flange's legs. Additionally, it is difficult to inspect the fire ring. Inspections using expensive electronic equipment have had only limited success.

SUMMARY OF THE INVENTION

A disclosed cylinder head gasket includes a cylinder bore opening receiving a fire ring holder retaining a fire ring in position. The fire ring holder comprises a plurality of spaced tabs extending radially outwardly from the holder at locations near both an upper edge and a lower edge. The tabs extend radially outwardly and come into mechanical engagement with either an upper surface or a lower surface of the gasket body.

The tabs replace the prior art flange. Because the surface area of contact between the tabs and gasket body is reduced by over 98% when compared to the prior art flange, virtually none of the available clamping force is required for tab operation. Thus, much greater force is available for sealing. Better sealing also results because of a reduced manufacturing uncertainty. A manufacturing tolerance exists for each of the opposed legs in the prior art flange. Such a double tolerance does not exist with the inventive use of a tab bent over into position. The tooling and manufacturing costs for the inventive fire ring holder are significantly less than those of the prior art flange. Further, the lack of a flange allows a fire ring with a larger cross-sectional diameter to be used. The diameter is not limited by the presence of a flange, including the corresponding thickness of associated legs. Also, the inventive fire ring holder allows visual inspection of an installed fire ring. The fire ring holder is protected from fretting corrosion and heat since it is disposed between the fire ring and the gasket body.

In one embodiment, the body of the fire ring holder is adapted to retain the ring. The holder body includes an inner diameter which is slightly less than an outer diameter of the ring. Further, the holder is curved between an upper edge and a lower edge to conform to an outer surface of the ring. By virtue of this arrangement, the holder provides additional radial support for the fire ring. The thickness of the holder determines the extent of this support.

In an alternative embodiment, the body of the fire ring holder is narrow with limited curvature between the upper edge and lower edge of the holder body. A number of spaced tabs extend radially inwardly to engage the ring and retain it in position.

BRIEF DESCRIPTION OF THE DRAWINGS

These and other features of the present invention will become more apparent upon reading the following detailed description, claims, and drawings, of which the following is a brief description:

FIG. 3 is an enlarged planar view of a portion of a gasket incorporating the present invention.

FIG. 4 is a cross-sectional view taken along line 4—4 in FIG. 3.

FIG. 5 is a cross-sectional view taken along line 5—5 in FIG. 3.

FIG. 6 is a cross-sectional view taken along line 6—6 in FIG. 3.

DESCRIPTION OF A DETAILED EMBODIMENT

Figure 1:
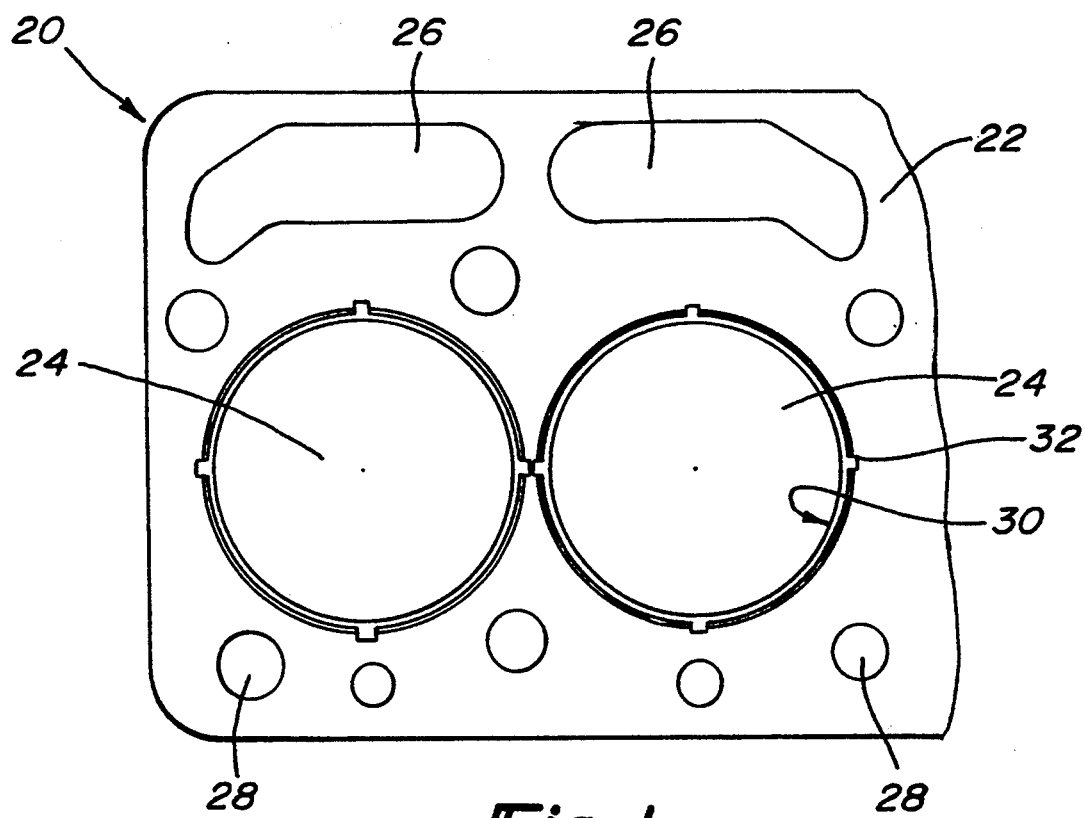
FIG. 1 is a planar view of a portion of a gasket incorporating the present invention.

A cylinder head gasket 20 illustrated in FIG. 1 includes a gasket body 22, cylinder bore openings 24, fluid flow openings 26, and bolt holes 28. Gasket 20 provides a combustion seal around cylinder bores 24 and provides a fluid flow seal around fluid flow openings 26. Gasket 20 also includes a fire ring 30 adjacent a cylinder bore 24 which is held in place by a fire ring holder 32. Fire ring 30 acts as armor to protect the remainder of gasket 20 from the effects of fretting corrosion, heat, and mechanical stress.

Figure 2:
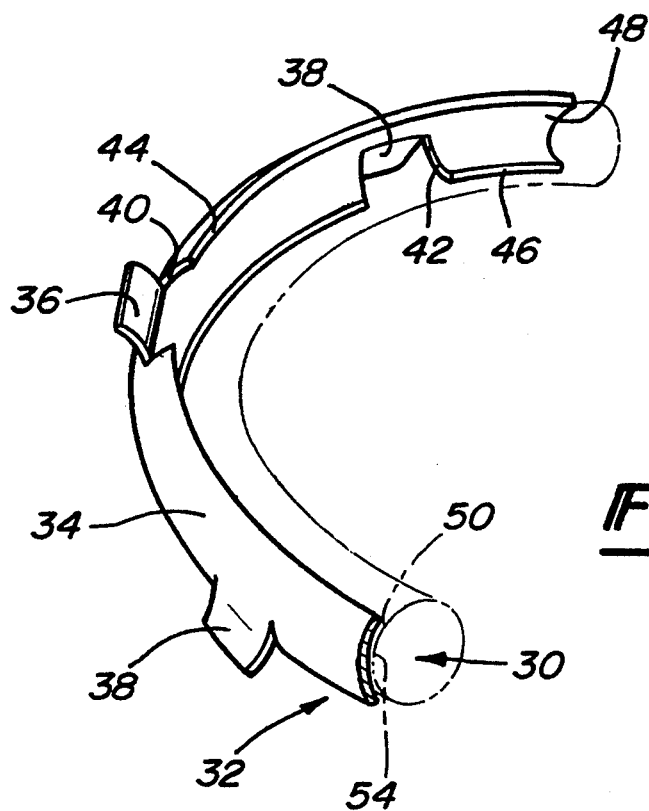
FIG. 2 is a fragmentary perspective view of a gasket fire ring holder and retained fire ring according to a first embodiment of the present invention.

Fire ring 30 and holder 32 are shown in greater detail in FIG. 2. Fire ring holder 32 has an annular body 34 with a plurality of spaced upper tabs 36 and lower tabs 38 formed thereon. Upper tabs 36 extend from body 34 radially away from an upper portion 40 adjacent an upper edge 44 while lower tabs 38 extend from body 34 radially away from a lower portion 42 adjacent a lower edge 46. A radially inner surface 48 of annular body 34 is slightly curved between upper edge 44 and lower edge 46 to conform to an outer surface 50 of fire ring 30 by which the fire ring is retained within holder 32. Inner surface 48 has various inner diameters intended to be slightly smaller than the corresponding outer diameters of an outer peripheral surface 54 of fire ring 30 to facilitate the retention of fire ring 30.

FIG. 3 illustrates the relationship between fire ring 30, holder 32 and gasket body 22 in greater detail. Upper tabs 36 and lower tabs 38 extend radially outwardly from annular body 34 to mechanically engage gasket body 22. Four upper tabs 36 and four lower tabs 38 are used in holder 32. While a total of eight circumferentially equally spaced tabs is illustrated with tabs 36 and 38 alternating around holder 32, it is intended that the size, shape, number, and location of the tabs may be varied as required by the particular gasket.

As shown in FIG. 4, upper tabs 36 mechanically engage an upper surface 56 of gasket body 22. Likewise, as illustrated in FIG. 5, lower tabs 38 mechanically engage a lower surface 58 of gasket body 22.

The surface area of contact between tabs 36 and 38, and gasket body 22 is reduced by over 98% when compared to the prior art flange. Thus, virtually none of the available clamping force is required for tab operation and much greater force is available for sealing.

Better sealing also results because of reduced manufacturing uncertainties. A manufacturing tolerance exists for each of the opposed legs in the prior art flange. Such a double tolerance does not exist with the inventive use of a tab bent over into position. A typical fire ring diameter has a ±0.001 inch (0.0254 mm) tolerance. A prior art 0.0094 inch (0.239 mm) thick holder flange has a ±0.0009 inch (0.0229 mm) tolerance from each of its legs. By eliminating at least one leg and replacing the second leg with a spaced tab, the seal manufacturing uncertainty due to the tolerances decreases from 0.0038 inches (0.0965 mm) to approximately 0.002 inches (0.0508 mm), a reduction on the order of 47%.

Further, the diameter of fire ring 30 is not limited by the presence of a flange, including the corresponding thickness of associated legs. Thus, gasket body 22 is provided increased protection.

Fire ring holder 32 facilitates visual inspection of installed fire ring 30. At the same time, the present invention also protects fire ring holder 32 from fretting corrosion and heat since it is disposed between fire ring 30 and gasket body 22.

As shown in FIG. 6, by virtue of the location of annular body 34 with respect to fire ring 30, holder 32 provides additional radial support for fire ring 30. The thickness of annular body 34 determines the amount of this support, and the thickness can be varied as necessary. It is intended that the material of holder 32 may be approximately the same as that of a flange based prior art fire ring holder. In one embodiment made by the present inventors, the thickness ranged from 0.0054 inches (0.1372 mm) to 0.047 inches (1.19 mm).

Figure 7:
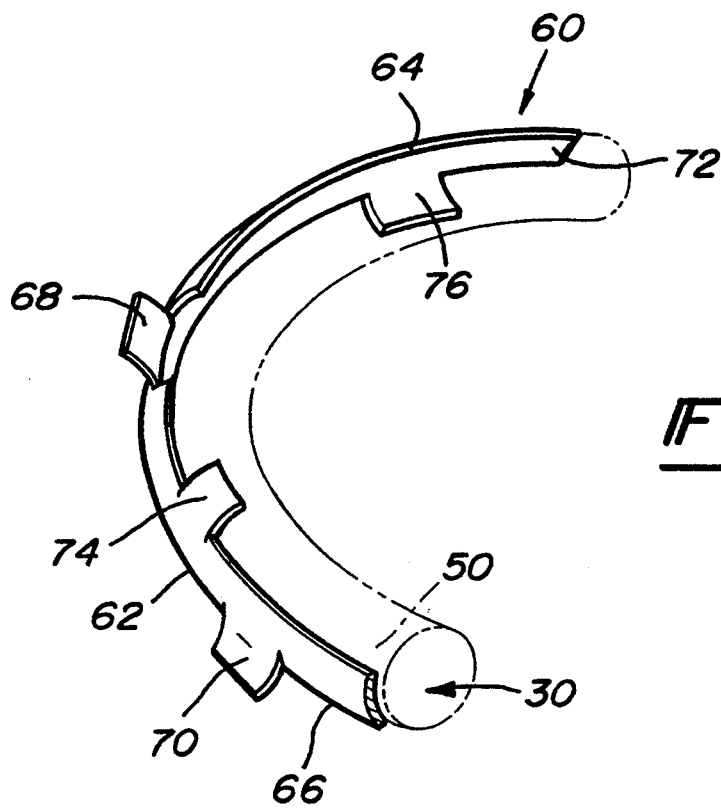
FIG. 7 is a fragmentary perspective view of a second embodiment of a gasket fire ring holder and retained fire ring.

An alternative embodiment, a fire ring holder 60, is illustrated in FIG. 7. Holder 60 has a narrow annular body 62 with limited curvature between an upper edge 64 and a lower edge 66. The narrow annular body engages a lesser portion of the circumferential surface of the fire ring and hence, may be insufficient to retain fire ring 30. Upper tabs 68 and lower tabs 70 extending radially outwardly from body 62 mechanically engage gasket body 22 as discussed above. Supplementing the use of inner surface 72 of body 62 to retain fire ring 30, upper tabs 74 and lower tabs 76 extending radially inwardly frictionally engage outer surface 50 of ring 30. While the number, shape, and size of these tabs may be adjusted, it is preferred that there be at least four upper tabs and four lower tabs, with half of the tabs extending radially inwardly to engage ring 30 and half extending radially outwardly to engage gasket body 22.

Figure 8:
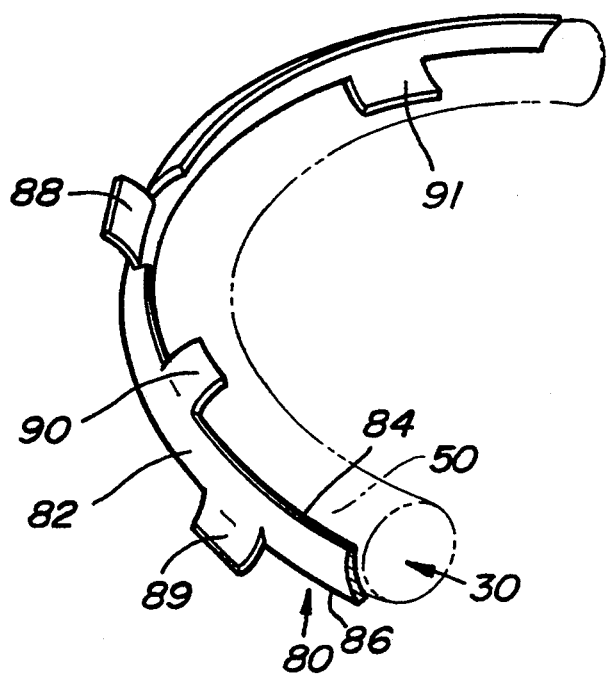
FIG. 8 is a fragmentary perspective view of a third embodiment of a gasket fire ring holder and retained fire ring.

A fire ring holder 80 with a very narrow annular body 82 is illustrated in FIG. 8. There is even less curvature between an upper edge 84 and a lower edge 86 to retain ring 30 than in the embodiment of FIG. 7. However, as in the embodiment of FIG. 7, upper tabs 88 and lower tabs 89 extend radially outwardly from body 82 while upper tabs 90 and lower tabs 91 extend radially inwardly. In this embodiment tabs 88, 89, 90, and 91 extend from the upper and lower edges 84 and 86. Further, because of the limited retention provided by body 82, it is preferred that a larger number (or tabs of greater total surface area) of radially inwardly extending tabs be used to secure fire ring 30 in position.

Preferred embodiments of the present invention have been described. It is to be understood that variations and modifications may be employed without departing from the scope of the present invention. For example, the fire ring may be secured to the fire ring holder by a welded joint, allowing all of the tabs to be used on the gasket body. Accordingly, the following claims should be studied to determine the true scope of the present invention.

We claim:

1. A cylinder head gasket comprising:
   a gasket body having at least one cylinder bore opening, said opening having a generally annular boundary;
   a fire ring holder disposed within said boundary, said holder having an annular body with a radially inner surface disposed between an upper edge of said holder and a lower edge of said holder, a plurality of spaced tabs extending radially away from said body, at least one of said tabs extending radially outwardly from said upper edge for mechanical engagement with an upper surface of said gasket body, and at least one of said tabs extending radially outwardly from said lower edge for mechanical engagement with a lower surface of said gasket body; and
   a fire ring having an outer peripheral surface, a radially outer portion of said peripheral surface of said fire ring being received in said body of said fire ring holder to retain said fire ring within said holder, a radially inner portion of said peripheral surface of said fire ring being free of contact with said gasket body and said fire ring holder 2. A cylinder head gasket as recited in claim 1, wherein said fire ring has a generally circular cross-section, an inner diameter of said annular body of said fire ring holder being slightly less than an outer diameter of said outer peripheral surface of said fire ring.

3. A cylinder head gasket as recited in claim 1, wherein said fire ring has a generally circular cross-section, said radially inner surface of said annular body of said fire ring holder being curved between said upper edge and said lower edge to conform to said peripheral surface of said fire ring.

4. A cylinder head gasket as recited in claim 1, wherein at least four of said tabs extend from said fire ring holder annular body away from said upper edge and alternate with other of said tabs extending from said fire ring holder annular body away from said lower edge.

5. A fire ring holder for use in retaining a fire ring in a cylinder head gasket comprising:
- an annular body including an upper portion ending adjacent an upper edge and a lower portion ending adjacent a lower edge, with retaining means to retain a fire ring to be used with said fire ring holder, wherein said retaining means includes an inner surface of said annular body being curved between said upper edge and said lower edge to conform to an outer surface of the fire ring, a plurality of circumferentially spaced tabs extending away from said annular body for frictionally engagement with an outer surface of the fire ring; and
- a plurality of circumferentially spaced upper tabs extending away from said upper portion and adapted for mechanical engagement with an upper surface of a gasket body and a plurality of lower tabs extending away from said lower portion and adapted for mechanical engagement with a lower surface of the gasket body.

6. A fire ring holder as recited in claim 5, wherein said upper tabs extend away from said upper edge of said annular body and said lower tabs extend away from said lower edge of said annular body.

7. A cylinder head gasket comprising:
- a gasket body having at least one cylinder bore opening, said opening having a generally annular boundary;
- a fire ring holder disposed within said boundary, said holder having an annular body with an upper portion adjacent an upper edge and a lower portion adjacent a lower edge, a plurality of spaced tabs extending radially away from said body, at least one of said tabs extending radially outwardly from said upper portion for mechanical engagement with an upper surface said gasket body, and at least one of said tabs extending radially outwardly from said lower portion for mechanical engagement with a lower surface of said gasket body; and
- a fire ring disposed radially inwardly of said fire ring holder, said fire ring holder having retaining means to retain said fire ring, wherein said retaining means includes at least one of said tabs extending radially inwardly from said annular body of said fire ring holder to engage said fire ring.

8. A cylinder head gasket as recited in claim 7, wherein an additional tab extends radially inwardly from one of said upper edge and said lower edge of said body.

9. A cylinder head gasket as recited in claim 7, wherein at least four of said tabs extend away from one of said upper portion and said lower portion, at least two of said tabs extending radially outwardly from said annular body to mechanically engage said gasket body and two other of said tabs extending radially inwardly from said annular body to retain said ring.

10. A cylinder head gasket as recited in claim 7, wherein said holder has an axial thickness, said thickness being between 0.0054 inches (0.1372 mm) and 0.047 inches (1.19 mm).

11. A fire ring holder for use in retaining a fire ring in a cylinder head gasket comprising:
- an annular body including a radially inner surface disposed between an upper portion ending adjacent an upper edge and a lower portion ending adjacent a lower edge, said radially inner surface of said body adapted to conform to a radially outer portion of an outer peripheral surface of the fire ring retained within said holder such that a radially inner portion of the peripheral surface of the fire ring is free of contact with the holder; and
- a plurality of circumferentially spaced upper tabs extending away from said upper portion and adapted for mechanical engagement with an upper surface of a gasket body and a plurality of lower tabs extending away from said lower portion and adapted for mechanical engagement with a lower surface of the gasket body.

* * * * *

UNITED STATES PATENT AND TRADEMARK OFFICE
CERTIFICATE OF CORRECTION

PATENT NO. : 5,340,126

DATED : August 23, 1994

INVENTOR(S) : Joseph Antonini and Ronald T. Budovec

It is certified that error appears in the above—identified patent and that said Letters Patent is hereby corrected as shown below:

Column 5, line 18, "frictionally" is changed to "frictional".

Signed and Sealed this

Twenty-fifth Day of October, 1994

Attest:

BRUCE LEHMAN

Attesting Officer

Commissioner of Patents and Trademarks